United States Patent
Amaya Gonzalez et al.

(10) Patent No.: US 12,526,093 B2
(45) Date of Patent: Jan. 13, 2026

(54) PERIODIC FREQUENCY DOMAIN DEPENDENT BLOCK ERROR RATE DETECTION AND MITIGATION

(71) Applicant: QUALCOMM Incorporated, San Diego, CA (US)

(72) Inventors: Norberto Amaya Gonzalez, San Diego, CA (US); Luis Munoz Loza, San Diego, CA (US); Sameh Guirguis, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/469,387

(22) Filed: Sep. 18, 2023

(65) Prior Publication Data
US 2025/0096956 A1    Mar. 20, 2025

(51) Int. Cl.
*H04L 1/20* (2006.01)
*H04L 1/00* (2006.01)

(52) U.S. Cl.
CPC ............ *H04L 1/203* (2013.01); *H04L 1/0009* (2013.01)

(58) Field of Classification Search
CPC .............................. H04L 1/203; H04L 1/0009
USPC .................................................. 714/748–750
See application file for complete search history.

(56) References Cited

U.S. PATENT DOCUMENTS

| | | | |
|---|---|---|---|
| 7,423,976 B2 * | 9/2008 | Wang | H03M 13/091 714/704 |
| 9,179,333 B1 * | 11/2015 | Bartlett | H04L 1/1877 |
| 2013/0308692 A1 * | 11/2013 | Lee | H04L 1/0009 375/224 |
| 2019/0380052 A1 * | 12/2019 | Yang | H04W 72/23 |
| 2020/0119836 A1 * | 4/2020 | Lyu | H04L 1/0025 |
| 2021/0036800 A1 * | 2/2021 | Berliner | H04L 1/0003 |
| 2021/0168821 A1 * | 6/2021 | Chen | H04L 5/0094 |
| 2021/0282145 A1 * | 9/2021 | Sundararajan | H04W 72/542 |
| 2022/0287125 A1 * | 9/2022 | Bathwal | H04L 1/0014 |
| 2022/0407581 A1 * | 12/2022 | Xu | H04W 72/21 |
| 2023/0198702 A1 * | 6/2023 | Kim | H04L 27/2601 370/329 |
| 2023/0422220 A1 * | 12/2023 | Li | H04L 1/1867 |

\* cited by examiner

*Primary Examiner* — Albert Decady
*Assistant Examiner* — Osman M Alshack
(74) *Attorney, Agent, or Firm* — Guang Y. Zhang; Patterson & Sheridan LLP

(57) ABSTRACT

Certain aspects of the present disclosure provide techniques for periodic, frequency domain dependent block error rate (BLER) detection and correction. An example method, performed at a first wireless node, generally includes identifying differences in BLER for different resources used for transmissions between the first wireless node and a second wireless node, and performing one or more actions to mitigate an impact of the identified differences in BLER on subsequent transmissions between the first wireless node and a second wireless node.

26 Claims, 15 Drawing Sheets

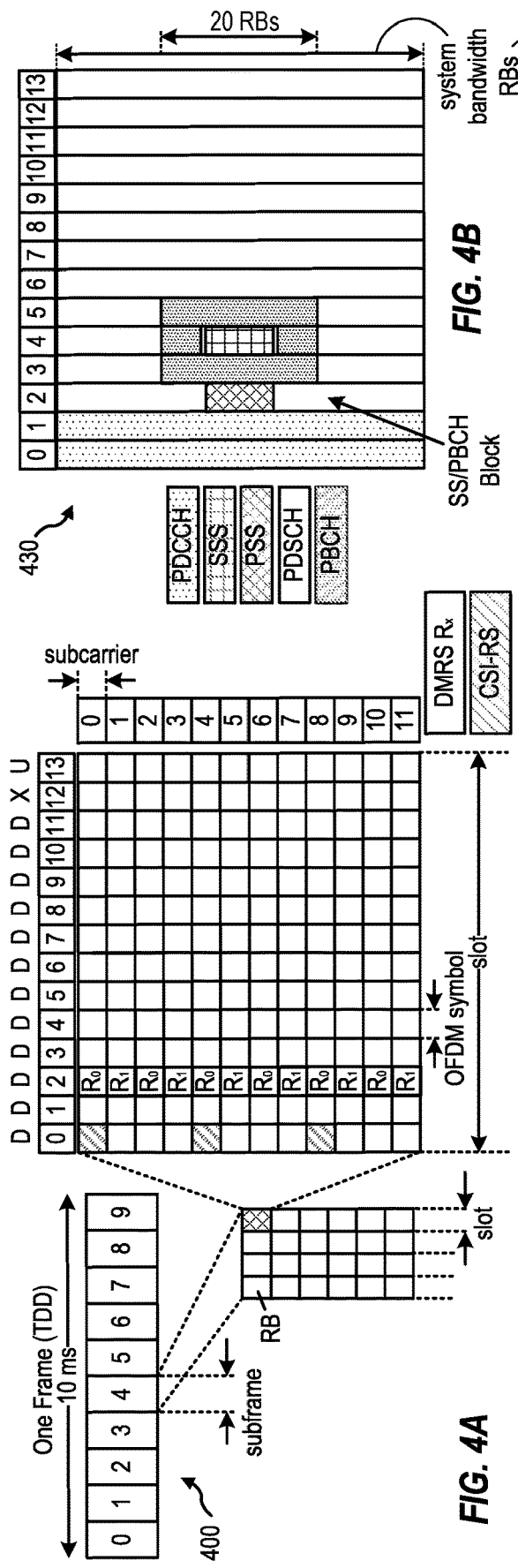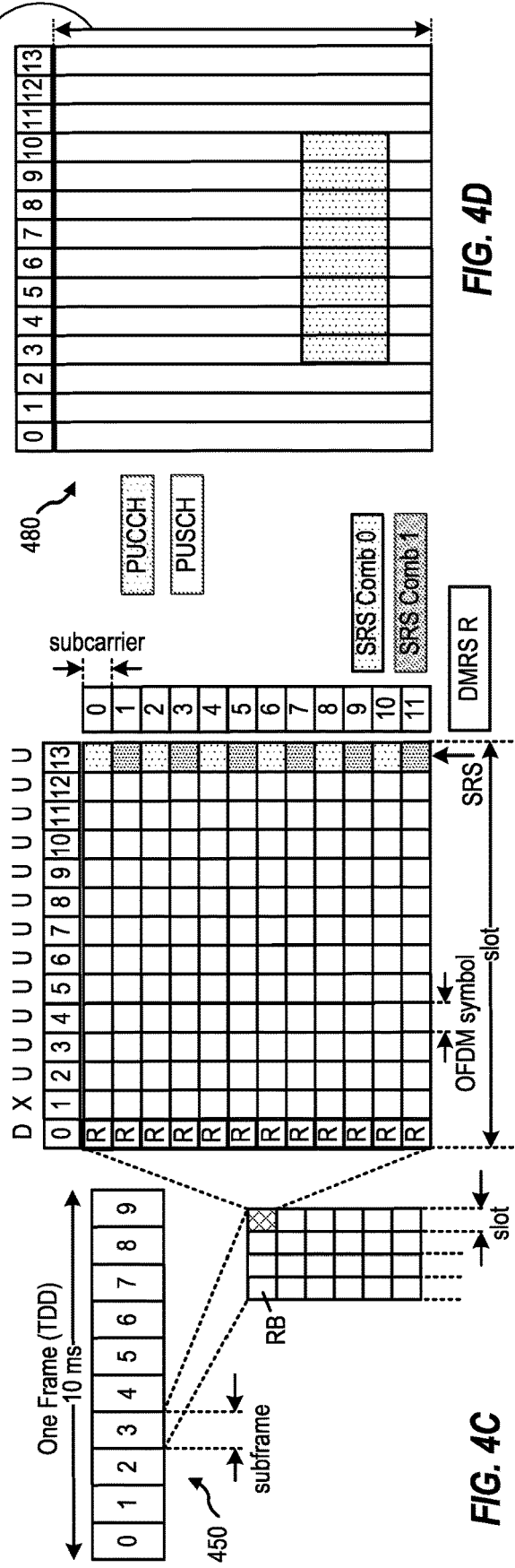

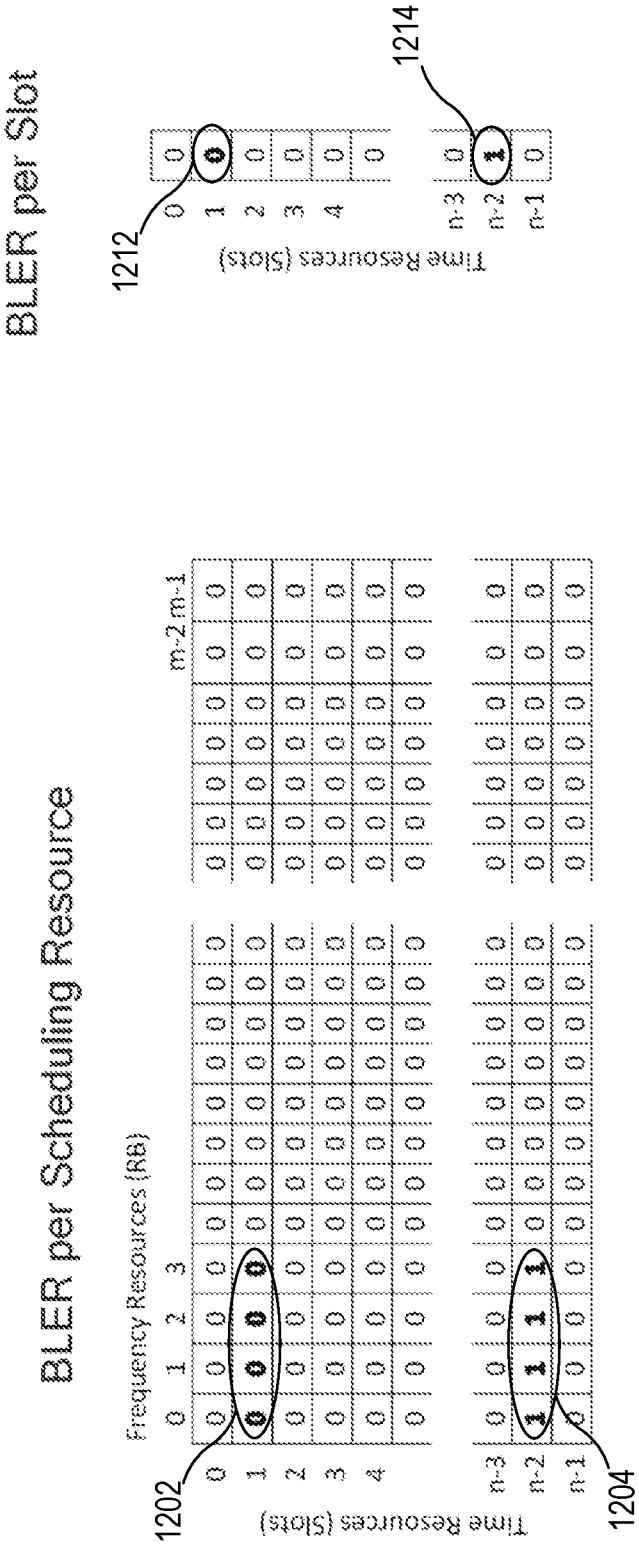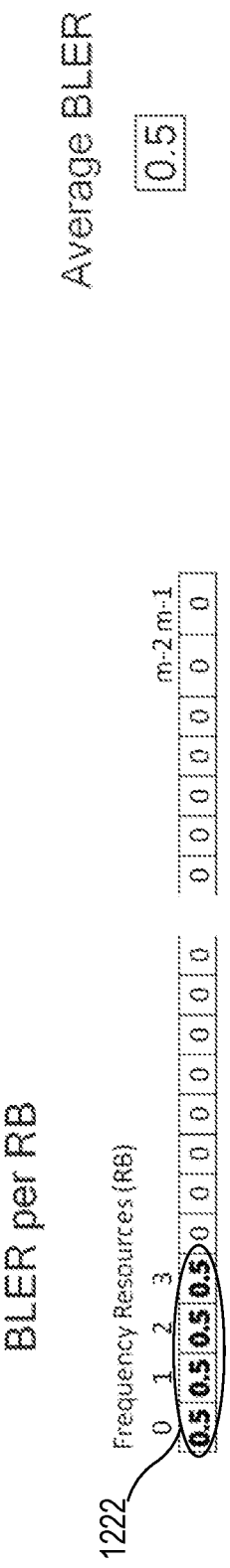
FIG. 12A
FIG. 12B
FIG. 12C
FIG. 12D

PERIODIC FREQUENCY DOMAIN DEPENDENT BLOCK ERROR RATE DETECTION AND MITIGATION

BACKGROUND

Field of the Disclosure

Aspects of the present disclosure relate to wireless communications, and more particularly, to techniques for periodic, frequency domain dependent block error rate (BLER) detection and mitigation.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first wireless node. The method includes identifying differences in block error rate (BLER) for different resources used for transmissions between the first wireless node and a second wireless node; and performing one or more actions to mitigate an impact of the identified differences in BLER on subsequent transmissions between the first wireless node and a second wireless node.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 11A and 11B depict example matrices illustrating transmissions per time-frequency resource, in accordance with certain aspects of the present disclosure.

FIGS. 12A, 12B, 12C, and 12D depict example BLER calculations, in accordance with certain aspects of the present disclosure.

DETAILED DESCRIPTION

Aspects of the present disclosure provide apparatuses, methods, processing systems, and computer-readable mediums for periodic, frequency domain dependent block error rate (BLER) detection and mitigation.

Various conditions in wireless networks, such as 5G cellular networks, can result in increased BLERs. BLER generally measures a percentage of transmissions are unsuccessfully received (and/or received with errors). BLER related issues can arise in various types of networks, including frequency division duplexed (FDD), time division duplexed (TDD), standalone (SA), and non-standalone (NSA) networks. BLER related issues can arise under areas of good and poor coverage and in multiple frequency bins.

Occasionally, large differences in BLER for downlink (DL) transmissions (DL BLER) are periodically observed on different time slots, even though the average BLER considering all slots may be close to an expected value (~10%). As an example, a specific slot may have high BLER (e.g. 25%) while other slots have significantly lower BLER (e.g. 5%). This abnormally high BLER on the specific slot may persist, for example, when a scheduler is trying to achieve a target average 10% BLER across all slots. Because the target average BLER is met, no action may be taken to mitigate the abnormally high BLER on the specific slot. In some cases, similar type large BLER differences may occur in different frequency regions, for example, depending on a scheduled RB. In other words, BLER may also be frequency-domain dependent in some cases.

Overall system performance, for example, as measured in spectral efficiency (SE) is impacted when BLER is either too high or too low. If BLER is too high, resources are wasted while retransmissions increase. If BLER is too low, more aggressive coding schemes could be used to increase throughput and more efficiently utilize resources.

Aspects of the present disclosure provide mechanisms by which a wireless node (e.g., a network entity, such as a gNB) can identify and mitigate large BLER differences that may occur periodically in the time domain, or between different RB regions in the frequency domain. As will be described in greater detail below, such mechanisms may operate in both the time and frequency domains together or separately, and may be activated or deactivated independently from one another.

Utilizing the mechanisms proposed herein to identify and mitigate regularly occurring differences in BLER may result in various benefits, such as increased spectral efficiency, improved system performance, and better user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
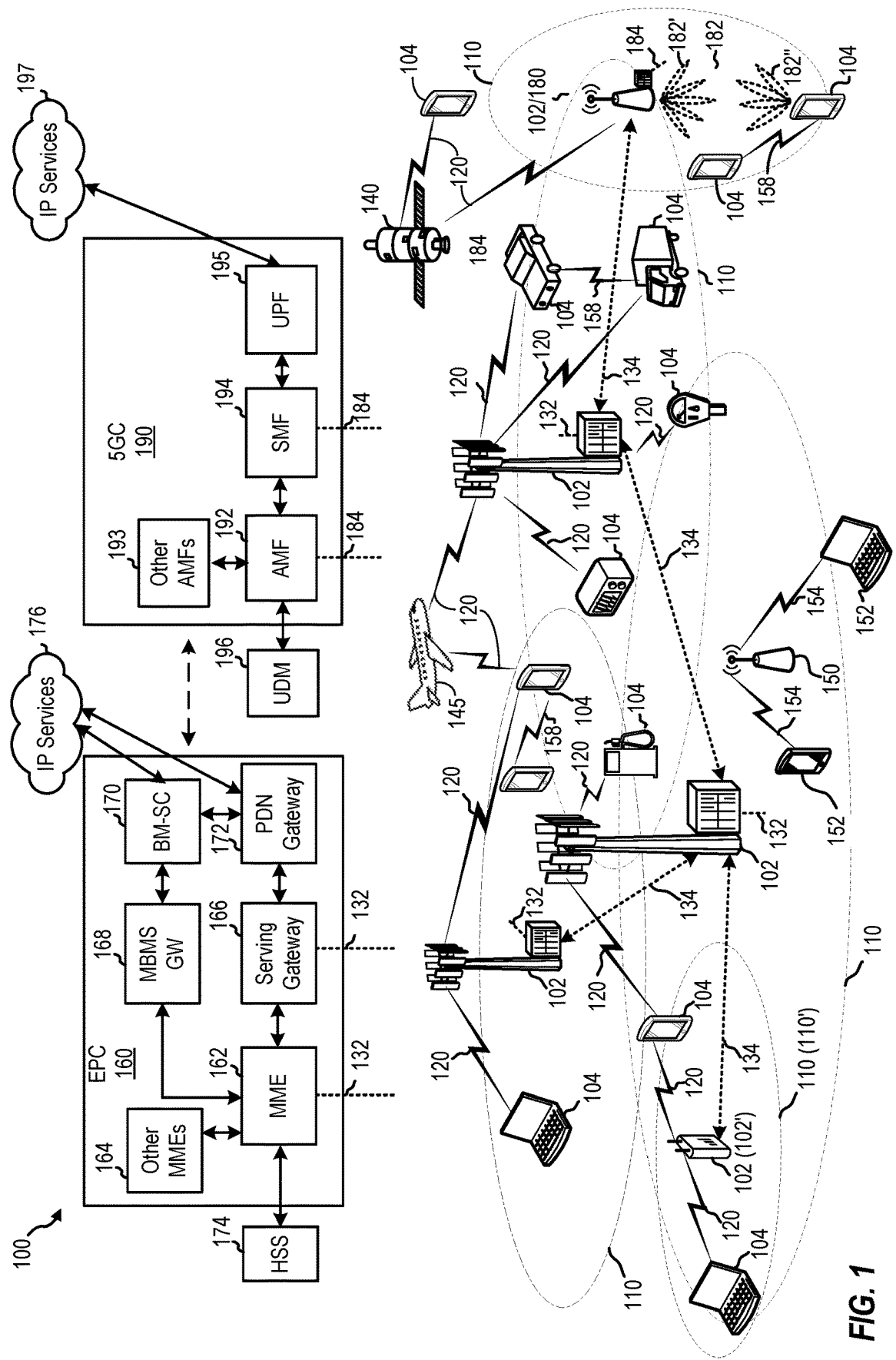
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
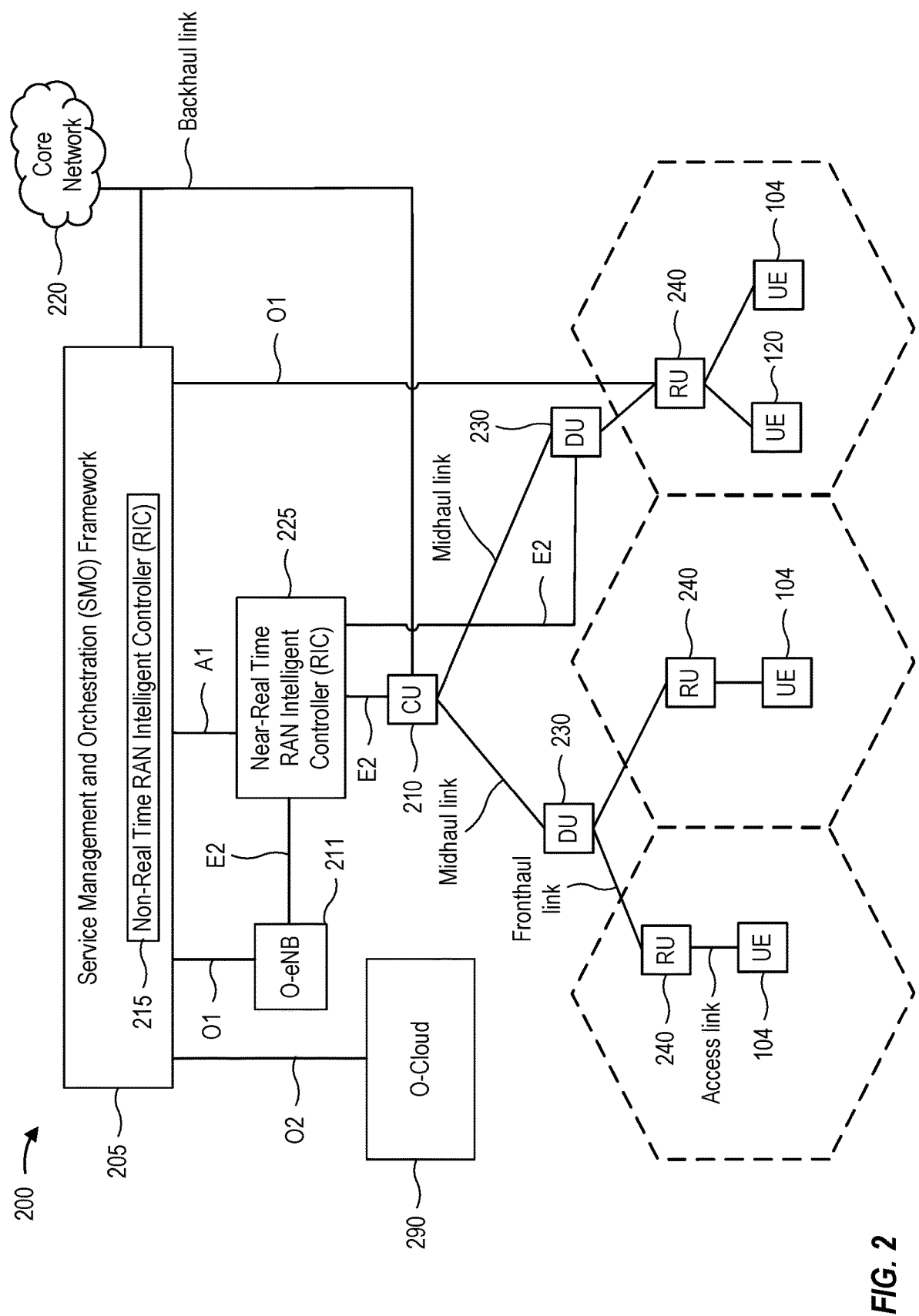
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182'''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
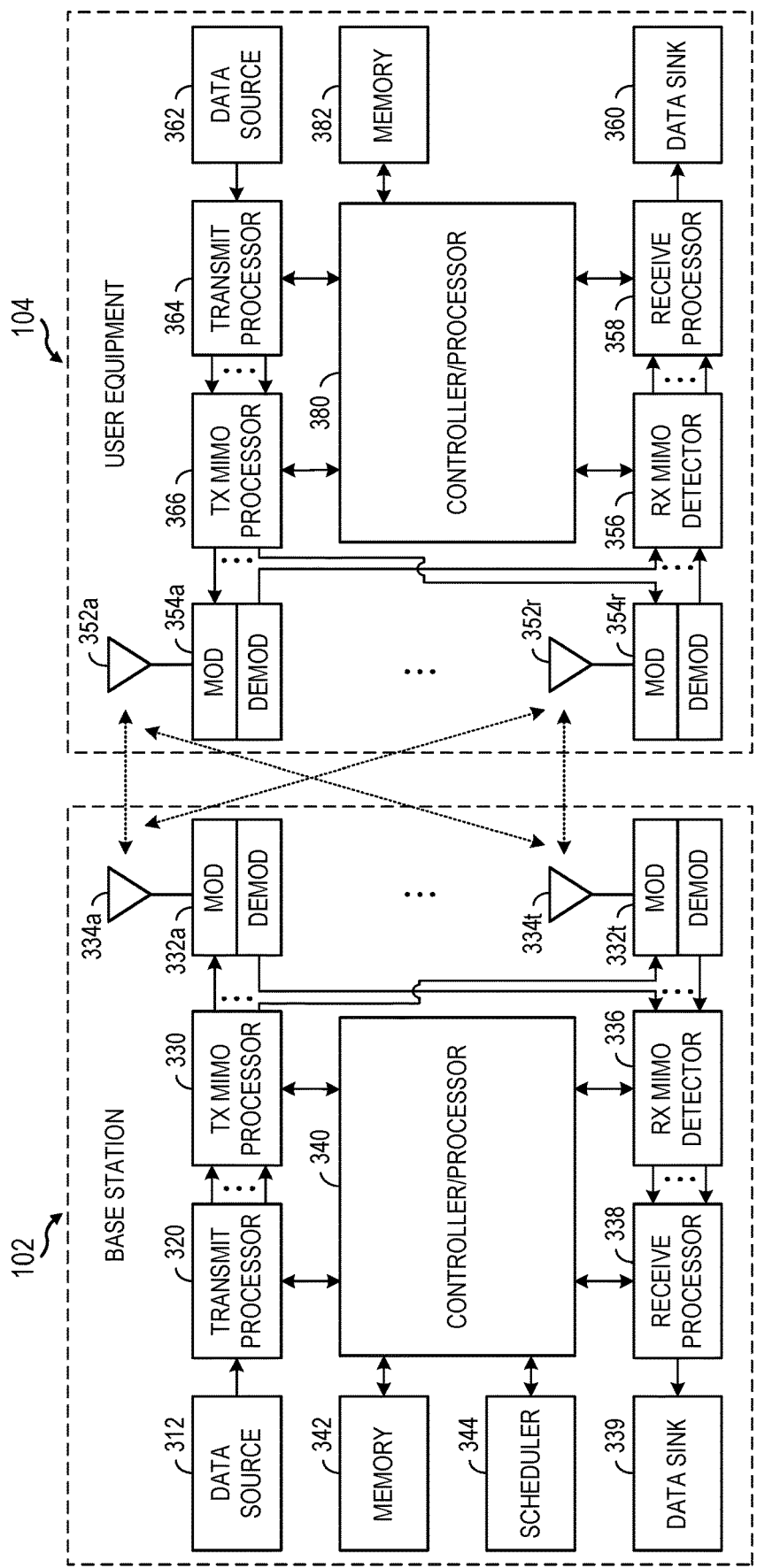
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Periodic Frequency Domain Dependent BLER Detection and Mitigation Aspects of the present disclosure provide apparatuses, methods, processing systems, and computer-readable mediums for periodic, frequency domain dependent block error rate (BLER) detection and mitigation.

As noted above, various conditions in wireless networks, such as 5G cellular networks, can result in increased BLERs. In some cases, large differences in DL BER are periodically observed on different time slots, even though the average BLER considering all slots may be close to an expected value. Unfortunately, spectral efficiency is impacted when BLER is either too high or too low.

Aspects of the present disclosure provide mechanisms by which a wireless node (e.g., a UE or network entity) can identify and mitigate large BLER differences that may occur periodically in the time domain, or between different RB regions in the frequency domain. Utilizing the mechanisms proposed herein to identify and mitigate regularly occurring differences in BLER may result in various benefits, such as increased spectral efficiency, improved system performance, and better user experience.

Figure 5B:
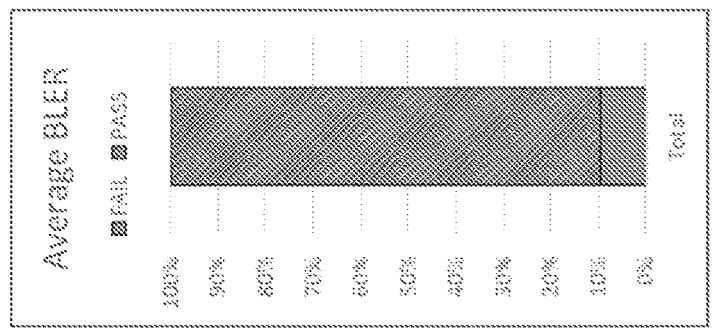
FIGS. 5A and 5B depict example graphs illustrating periodic high physical downlink shared channel (PDSCH) block error rate (BLER).
Figure 5A:
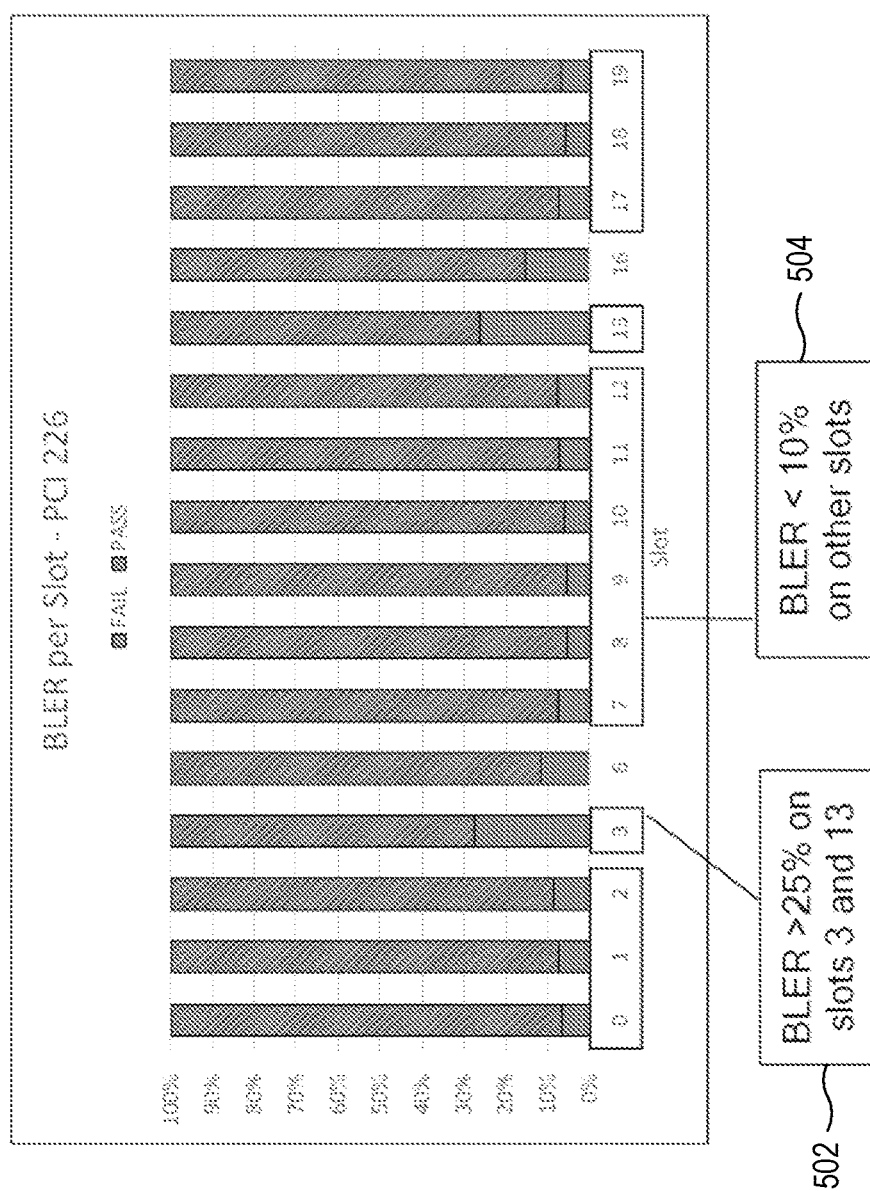

FIG. 5A depicts an example graph 500 illustrating how periodic high physical downlink shared channel (PDSCH) block error rate (BLER) may be observed by network performance analysis. As indicated at 502, in the illustrated example, BLER>25% is observed every 10 slots, for slots 3 and 13, at a 5 ms periodicity, while BLER>10% is observed for slots 6 and 16 (also at 5 ms periodicity). As indicated at 504, BLER<10% is observed for other slots. As illustrated in graph 550 of FIG. 5B, this results in an average BLER of 9.5%, when considering all slots.

Figure 6:
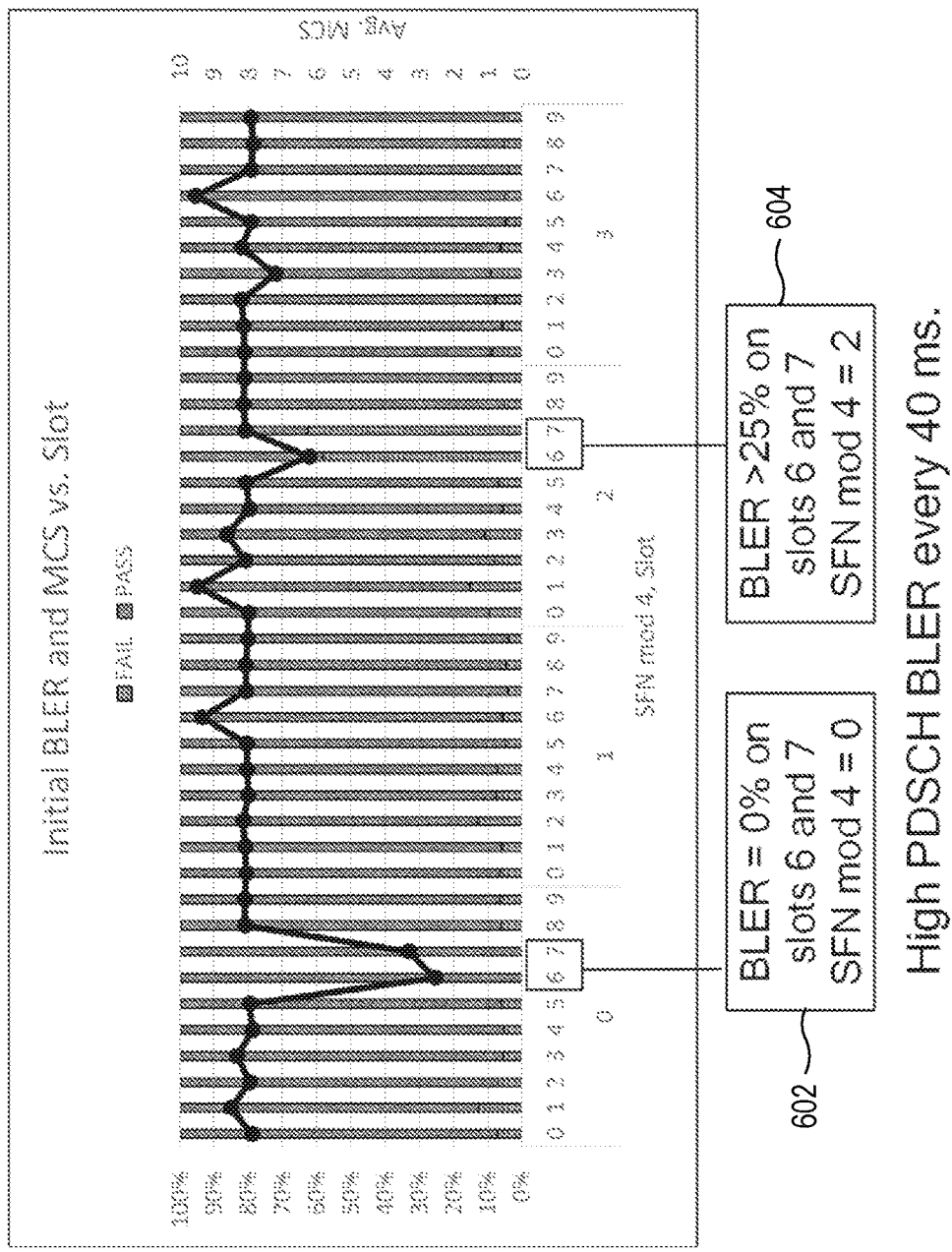
FIG. 6 depicts an example graph illustrating periodic high PDSCH BLER.

FIG. 6 depicts another example graph 600 illustrating periodic high PDSCH BLER. As indicated at 604, in this example, initial BLER of 60% is observed on slots 6 and 7, when SFN mod 4=2 (e.g., 40 ms periodicity). During these slots, there is no sufficient correction on scheduled modulation and coding scheme (MCS) to reduce BLER close to (the target BLER of) 10%. However, lower than expected MCS is observed on slots 6 and 7 of SFN mod 4=0, which causes BLER on these slots (6 and 7 of SFN mod 4=0) to drop to near 0, as indicated at 604. This may be indicative of the scheduler trying to correct the high BLER, but with the MCS adjustment being applied on the wrong slots.

Figure 7:
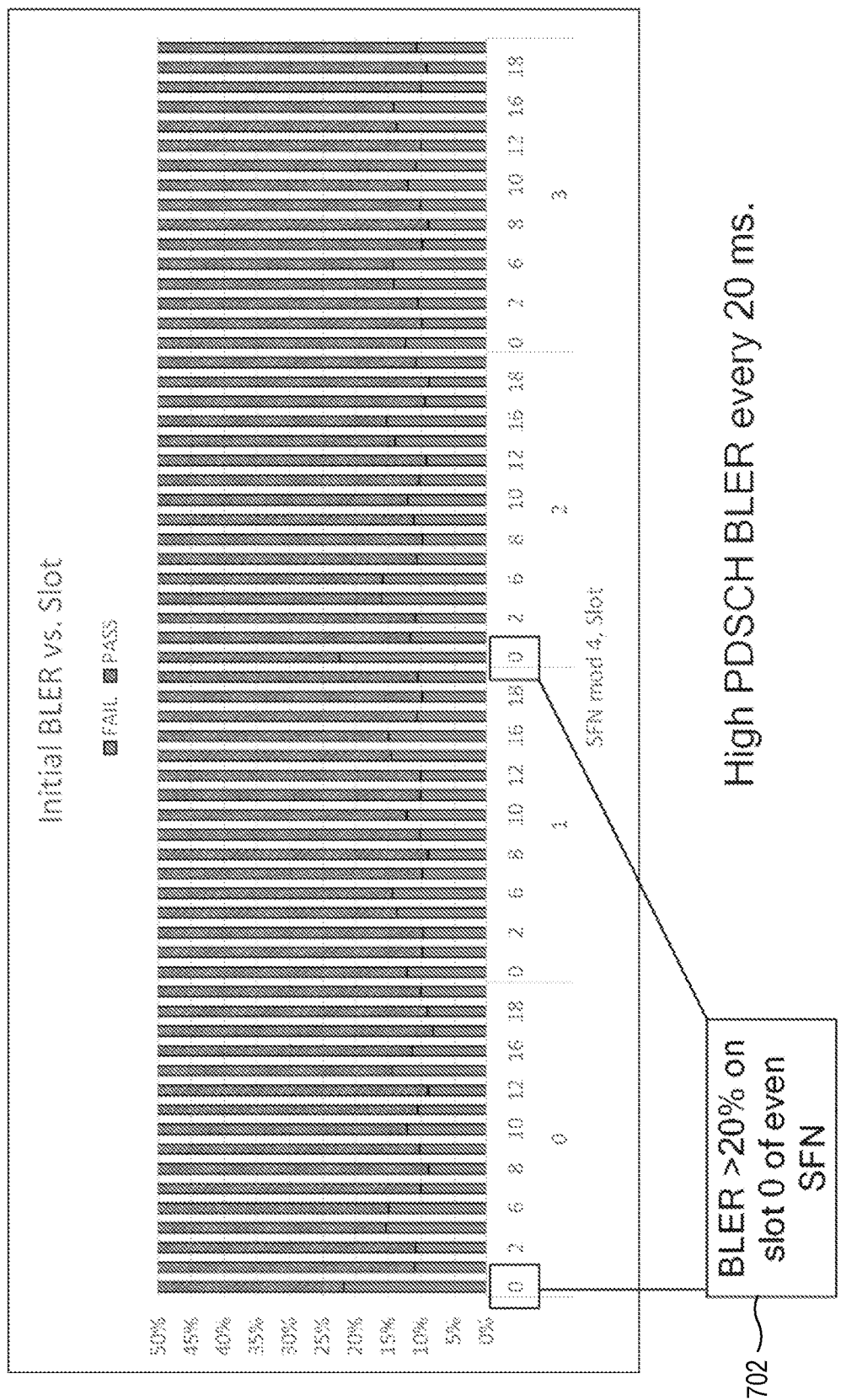
FIG. 7 depicts an example graph illustrating periodic high PDSCH BLER.

FIG. 7 depicts another example graph 700 illustrating periodic high PDSCH BLER. As illustrated at 702, in this example, BLER>20% is observed for slot 0 of even SFNs (e.g., 20 ms periodicity). In the illustrated example, BLER>10% is observed on slots 3, 6, 13 and 16 show, often reaching 15%, while other slots show BLER around 10%.

Figure 8:
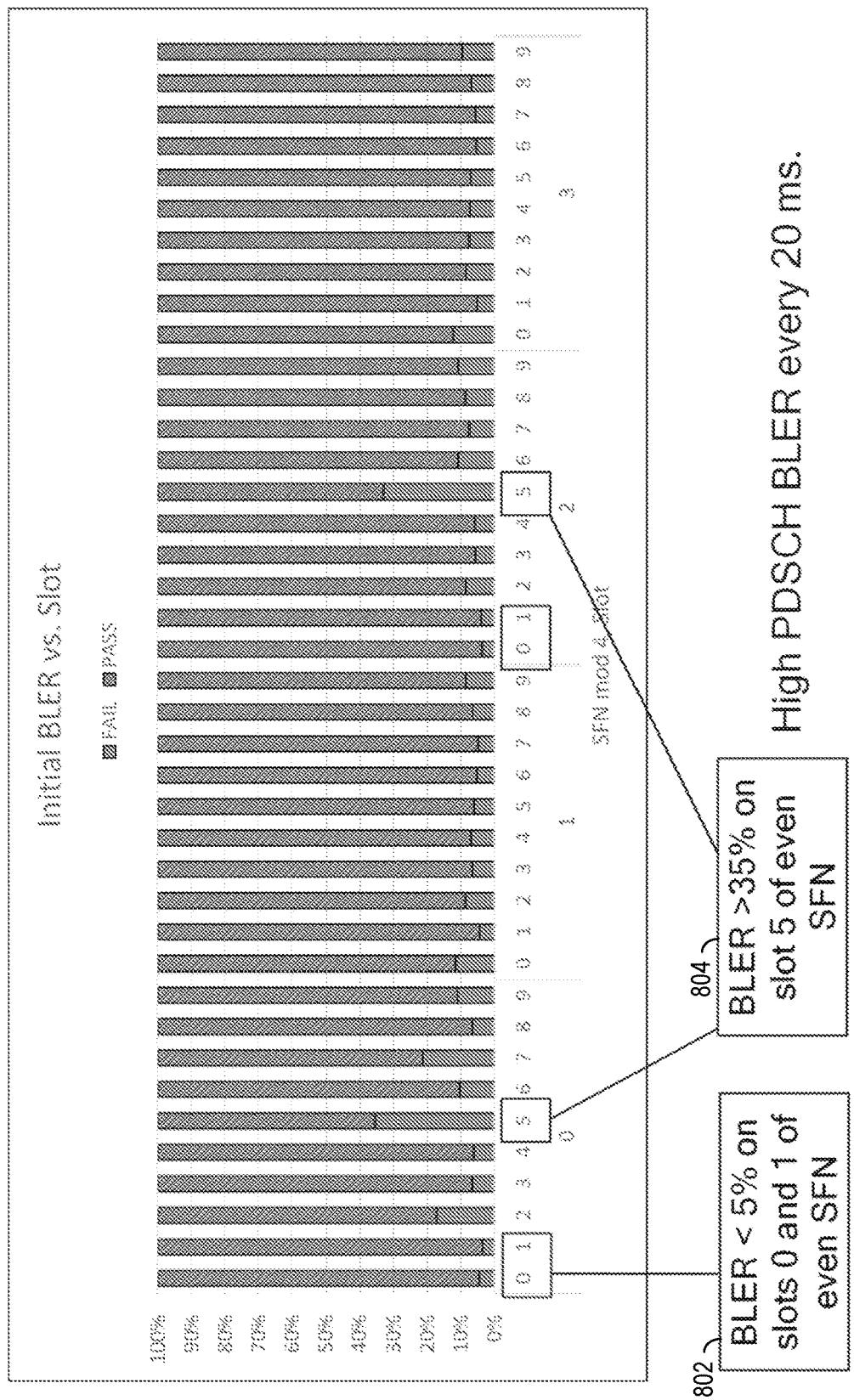
FIG. 8 depicts an example graph illustrating periodic high PDSCH BLER.

FIG. 8 depicts another example graph 800 illustrating periodic high PDSCH BLER. As indicated at 804, BLER>35% is observed for slot 5 of even SFN (e.g., 20 ms periodicity). High BLER is observed on slots 2 and 7 when SFN mod 4=0 and BLER<10% is observed on other slots. As indicated at 802, BLER<5% is observed on slots 0 and 1 on even SFNs.

Figure 9:
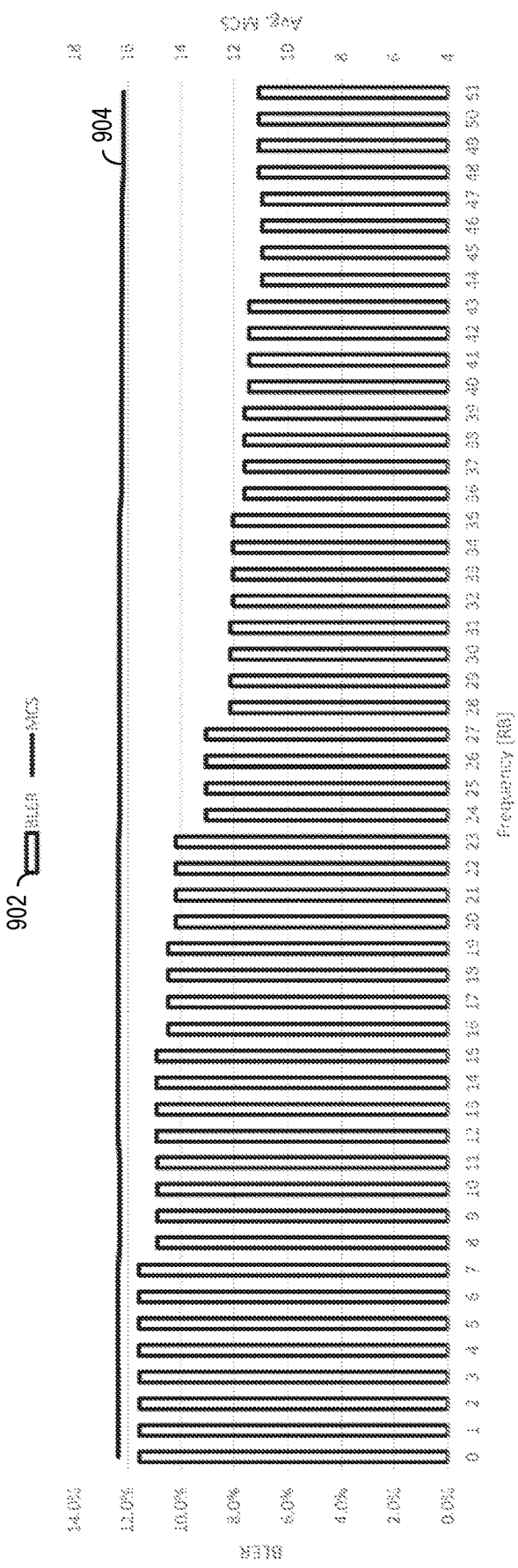
FIG. 9 depicts an example graph illustrating frequency domain dependent PDSCH BLER.

FIG. 9 depicts an example graph 900 illustrating frequency domain dependent PDSCH BLER 902. In the illustrated example, DL BLER is higher towards lower PRBs and lower on high PRBs. This observation may be due to different interference levels on the high and low PRBs. As indicated at 904, scheduled MCS does not vary much from low PRBs to high PRBs. This observation may indicate the gNB link adaptation (LA) algorithm may not consider the frequency-domain BLER dependence.

BLER observations may be due to various factors. For example, PDSCH resource allocation may be symmetric with respect to the center of the channel. DL BLER tends to be higher towards lower PRB and lower on high PRB.

There are other potential reasons for the types of slot and frequency specific BLER observations depicted in FIGS. 5-9. For example, the BLER observations may be due to transmissions from neighbor cells, such as SSBs, non zero-power channel state information reference signals (NZP CSI-RS), physical random access channel (PRACH), system information block 1 (SIB1), and paging. Other potential reasons may include configuration issues, hardware issues, and external interference. Unfortunately, channel quality indicator (CQI) reports may be unable to capture inter-cell interference from all sources. Further, typical CSF report periodicity is 40 ms.

Aspects of the present disclosure provide mechanisms by which a wireless node can identify and mitigate large BLER differences that may occur periodically in the time domain, or between different RB regions in the frequency domain. The operations to identify and mitigate BLER differences may be performed at a UE and/or network side. Further, the operations may be performed for uplink (e.g., PUSCH) or downlink (e.g., PDSCH) transmissions.

The techniques proposed herein may be implemented using an Artificial Intelligence technique, such as Machine Learning, in order to correct the high BLER in an adaptive manner and for the system to support self-optimization. As will be described in greater detail below, various types of variables could be supported.

Figure 10:
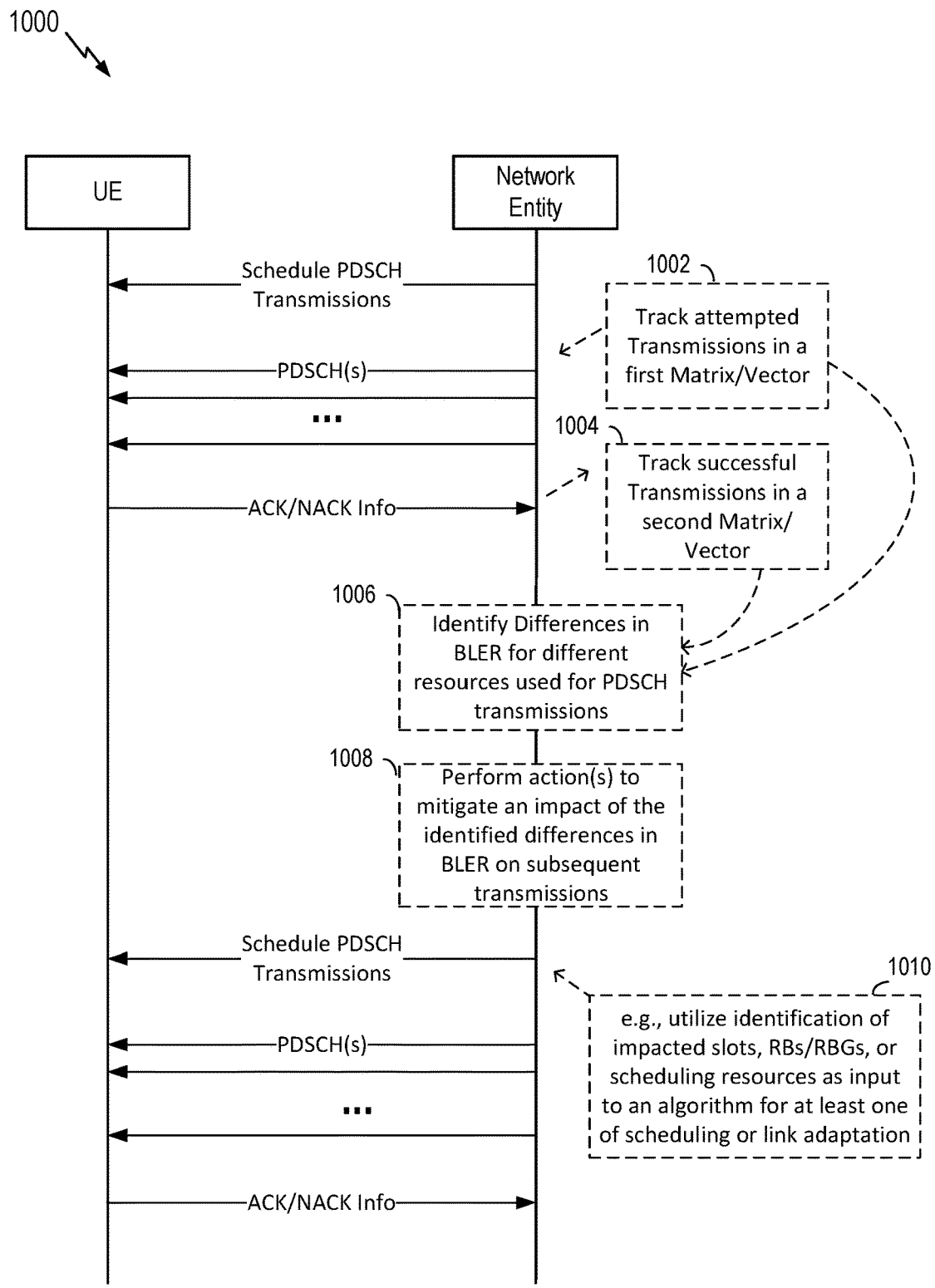
FIG. 10 depicts a call flow diagram illustrating techniques for periodic, frequency domain dependent BLER detection and correction, in accordance with certain aspects of the present disclosure.

FIG. 10 depicts a call flow diagram 1000 illustrating techniques for PDSCH BLER detection and mitigation by a network entity, in accordance with certain aspects of the present disclosure. In some aspects, the UE shown in FIG. 10 may be an example of the UE 104 depicted and described with respect to FIGS. 1 and 3. In some aspects, the network entity shown in FIG. 10 may be an example of the BS 102 (e.g., a gNB) depicted and described with respect to FIGS. 1 and 3 or a disaggregated base station depicted and described with respect to FIG. 2

As illustrated at 1006, the network entity may identify differences in BLER for different resources used for PDSCH transmissions. As indicated at 1002, in some cases, the network entity may track attempted transmissions in a first data structure (e.g., a Matrix/Vector). As indicated at 1004, in some cases, the network entity may also track successful transmissions in a second data structure (e.g., a Matrix/Vector). The second data structure may be updated based on acknowledgment (ACK)/negative acknowledgment (NAK) information obtained from the UE. In some cases, a UE may use similar structures on its end to monitor BLER and could report such structures as BLER feedback.

As will be described in greater detail below, these data structures may be used to identify the differences in BLER for different resources used for PDSCH transmissions (e.g., per slot, per RB, per RBG, or per RB-per slot).

As illustrated at 1008, the network entity may then perform one or more action to mitigate an impact of the identified differences in BLER on subsequent transmissions. For example, as indicated at 1010, the network entity may utilize the identification of impacted slots, RBs/RBGs, or scheduling resources as input to an algorithm for at least one of scheduling or link adaptation (LA).

By using the mechanisms proposed herein, BLER can be tracked for different time and frequency resources used for transmission between a gNB and a specific UE. The data structures used to track the number of transmissions and the number of successful transmissions may be any suitable structure.

Figures 11A, 11B:
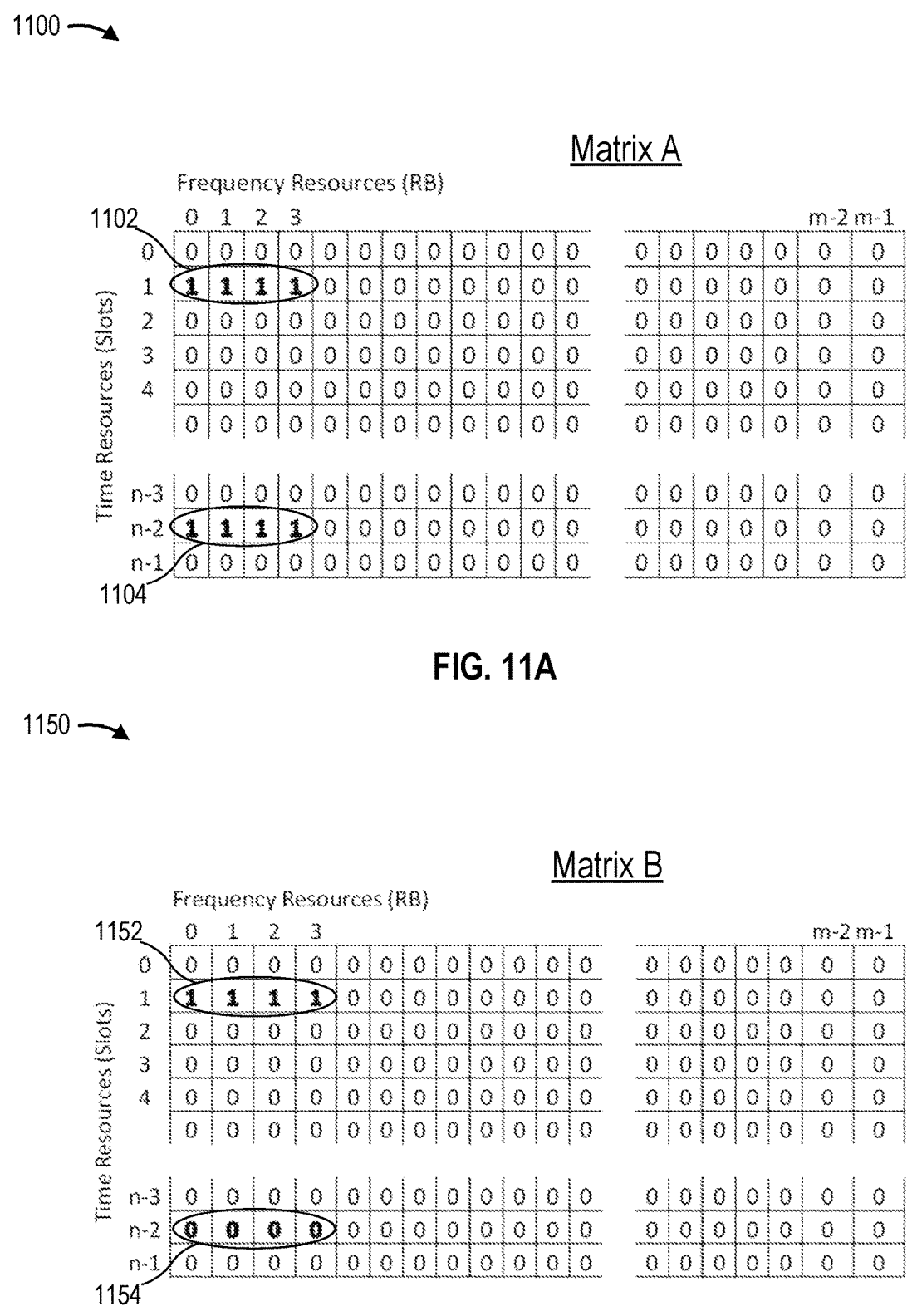

For example, as illustrated in FIGS. 11A and 11B, two matrices 1100 and 1150 of size n×m may be defined. These matrices may be referred to as A and B, and the value of all the elements is initialized to 0.

As illustrated in FIG. 11A, Matrix A may be used to keep track of the number of transmissions where each time-frequency scheduling resource is used. As illustrated in FIG. 11B, Matrix B may be used to keep track of the number of successful transmissions, where each time-frequency scheduling resource is used.

In this context, a scheduling resource may refer to a resource that can be individually allocated by the scheduler. For example, a scheduling resource could be a resource block group (RBG) or resource block (RB) in the frequency domain and slots in the time domain.

For the m×n matrices shown in FIGS. 11A and 11B, m generally refers to the number of frequency resources (e.g. RBG or RB), while n refers to the number of time resources (e.g. slots). Thus, the value of n generally indicates the time-domain periodicity used, which may be chosen based on the number of Radio Frames to monitor.

For example, if r is the number of radio frames to monitor, and u is the numerology, then the value of n may be determined as:

$$n = 10r2^\mu.$$

The time-domain index in either matrix, s, may be calculated as:

$$s = 10(SFN \% r)2^\mu + \text{slot},$$

where % represents the modulo operation, and slot represents the slot number where the transmission takes place.

A BLER monitoring procedure, in accordance with aspects of the present disclosure, may be performed as follows. If m=1, matrices A and B may essentially be one-dimensional vectors with different elements representing different scheduling resources in the time domain (e.g. slots). In the frequency domain the whole channel or BWP bandwidth is considered. If n=1, A and B are essentially one-dimensional vectors with different elements representing different scheduling resources (e.g., RBG or RB) in the frequency domain. In the time domain only the last (filtered or unfiltered) sample values may be considered.

For every transport block transmitted from the gNB to the UE using a set of resources R, comprising a number of individual time-frequency resources $r_{s,t}$ where s represents the frequency resource (e.g., RBG or RB) and t represents the time resource (e.g. slot), the values of A (s,t) may be incremented by 1. s and t may be within the following ranges:

$$0 \le s < m \text{ and } 0 \le t < n.$$

After reception of HARQ ACK from the UE for a transport block previously transmitted using a set of resources R, comprising a number of individual time-frequency resources $r_{s,t}$, the values of B (s,t) may be incremented by 1.

Referring again to FIGS. 11A and 11B, examples of how Matrix A and Matrix B can be used to track total transmissions per time-frequency resource and total successful transmissions per time-frequency resource are depicted.

As illustrated at 1102 and 1152, in one example, one successful transmission is observed using RB 0 to 3 during slot 1 (resulting in "1111" in Matrix B). In this context, success may indicate that a HARQ ACK was received from the UE. As illustrated at 1104 and 1154, in a second example, one unsuccessful transmission is observed using RB 0 to 3 during slot n−2 (resulting in "0000" in Matrix B), for example, if HARQ ACK was not received from the UE.

Given the content in the Matrix A and Matrix B, various BLER related metrics may be calculated, such as BLER per scheduling resource, per slot, and per RB. For example, BLER per scheduling resource may be calculated by performing the following element-wise operation:

$$BLER_{s,t} = \begin{cases} 1 - \frac{B_{s,t}}{A_{s,t}} & \text{if } A_{s,t} > 0 \\ 0 & \text{otherwise} \end{cases}.$$

BLER per slot can also be calculated from matrixes A and B, as:

$$BLER_t = \begin{cases} 1 - \frac{\sum_{s=0}^{m-1} B_{s,t}}{\sum_{s=0}^{m-1} A_{s,t}} & \text{if } \sum_{s=0}^{m-1} A_{s,t} > 0 \\ 0 & \text{otherwise} \end{cases}.$$

BLER per RB can also be calculated from matrixes A and B, as:

$$BLER_s = \begin{cases} 1 - \frac{\sum_{t=0}^{n-1} B_{s,t}}{\sum_{t=0}^{n-1} A_{s,t}} & \text{if } \sum_{t=0}^{n-1} A_{s,t} > 0 \\ 0 & \text{otherwise} \end{cases}.$$

Average BLER considering all resources may be calculated as:

$$BLER_{Avg} = \begin{cases} 1 - \frac{\sum_{s=0}^{m-1} \sum_{t=0}^{n-1} B_{s,t}}{\sum_{s=0}^{m-1} \sum_{t=0}^{n-1} A_{s,t}} & \text{if } \sum_{s=0}^{m-1} \sum_{t=0}^{n-1} A_{s,t} > 0 \\ 0 & \text{otherwise} \end{cases}.$$

FIGS. 12A, 12B, 12C, and 12D depict corresponding calculations for such BLER metrics, based on the examples shown in FIGS. 11A and 11B.

As shown at 1202 in FIG. 12A, the BLER per scheduling resource is 0 for RB0-3 at slot 1 (indicating no errors, as these transmissions were successfully received). As shown at 1204, the BLER per scheduling resource is 0 for RB0-3 at slot n-2 (indicating an error for each of these transmissions). Given this result, as shown at 1212 and 1214 in FIG. 12B, the BLER per slot is 0 for slot 1 and 1 for slot n−2. As shown at 1222 and 1224 in FIG. 12C, the BLER per RB is 0.5 (average of 0 and 1) for RBs 0-3. As shown in FIG. 12D, average BLER (per slot/per RB) is 0.5 (average 0.5 for all 4 RBs).

Given the BLER information identified, a scheduler may identify certain information and take action to mitigate BLER. For example, the techniques proposed herein can be used to identify slots with high periodic BLER, by comparing the BLER value of specific slots with the total average BLER. Similarly, the techniques proposed herein can be used to identify RB with high relative BLER, by comparing the BLER value of specific RB with the total average BLER. The techniques proposed herein may also be used to identify specific time-frequency scheduling resources (slot, RB) with high BLER, by comparing the BLER value of specific time-frequency scheduling resources with the total average BLER.

Figure 13:
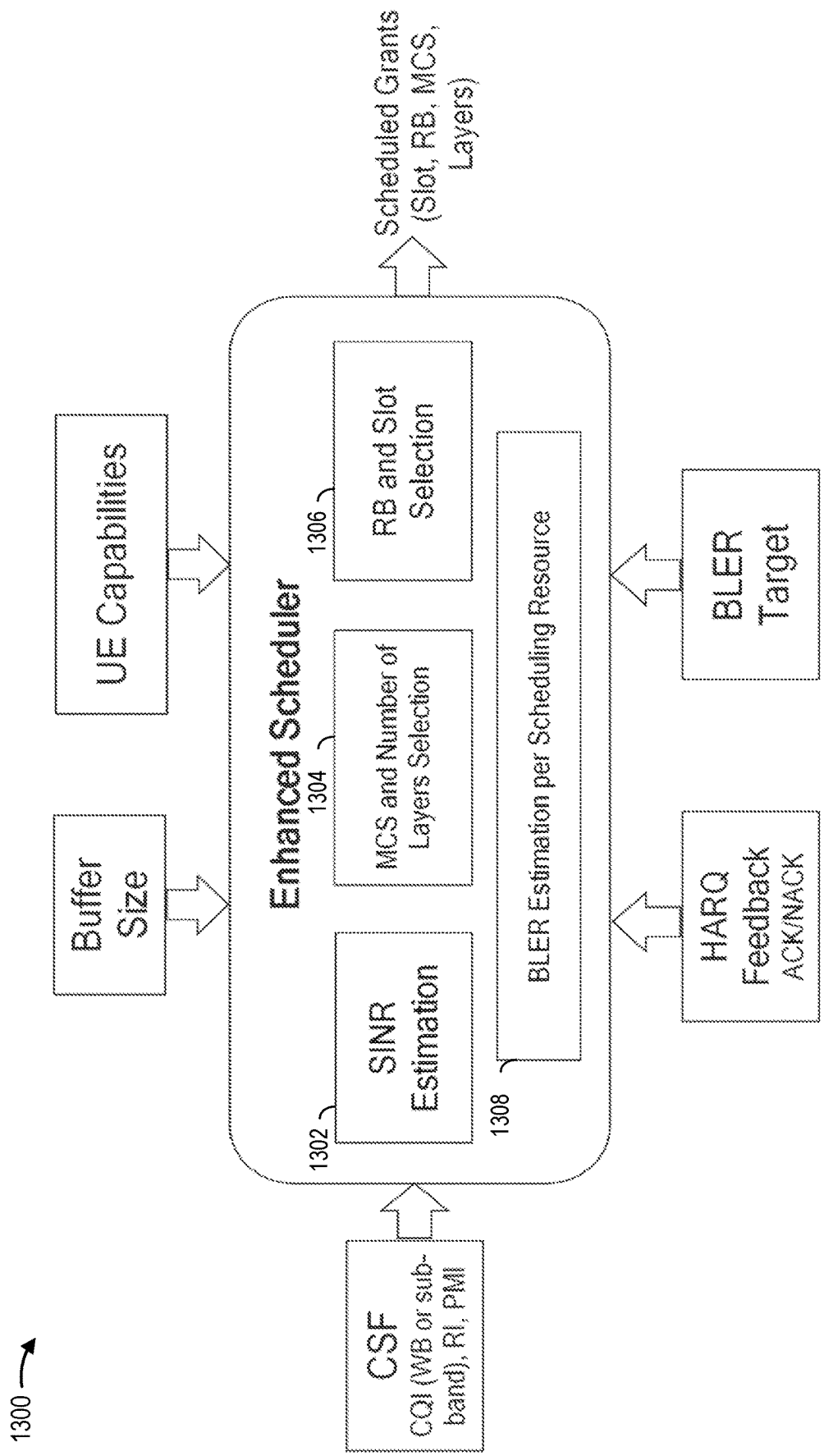
FIG. 13 depicts an example diagram illustrating an enhanced scheduler, in accordance with certain aspects of the present disclosure.

FIG. 13 illustrates an example of an enhanced scheduler 1300 that may utilize the BLER identification and mitigation techniques proposed herein. For example, after identifying resources with high BLER (e.g., via a BLER estimation and per scheduling resource component 1308), this information can be input to the scheduling and link adaptation algorithm of the enhanced scheduler so that the high BLER can be corrected. For instance, by applying an offset to estimated SINR for the resources affected by abnormal BLER (via SINR estimation 1302), a link adaptation (LA) algorithm may be able to calculate suitable MCS/Number of Layers for the impacted slots (via MCS and Number of layer selection 1304), in an effort to bring their BLER to approximate the BLER target. Such mitigation efforts may help increase the corresponding spectral efficiency.

As noted above, in some cases, activation of time or frequency BLER monitoring and mitigation may be performed independently. BLER monitoring and mitigation in the frequency domain (e.g., per RBG or per RB) may be useful to detect and mitigate issues related to external interference, which may impact a portion of the allocated spectrum. In some cases, the allocated modulation and coding scheme (MCS) and number of layers may be adjusted to mitigate external interference issues.

In some cases, certain mitigation efforts may not work. For example, in some cases, the interference may be so high that even the most robust MCS may be unable to mitigate the issue. In such cases, a scheduling algorithm (scheduler) may be configured to avoid (no to use) the affected RB (e.g., via RB and slot selection 1306).

Various alternatives may be used to calculate the scheduled MCS and number of layers offset, such as a cumulative, increasing or decreasing calculation, proportional to BLER delta. In some cases, offset update rates may be configurable and may take into account the monitoring periodicity of matrices A and B, and the LA update rate. Thus, in some cases, there may be two types of LA. A first type, fast LA, may work on all channel resources. For a second type, slow LA, offsets may be adjusted per scheduling resource. In some cases, offset updates in time and frequency may not need to occur with the same periodicity.

Utilizing the mechanisms proposed herein to identify and mitigate regularly occurring differences in BLER may result in various benefits, such as increased spectral efficiency, improved system performance, and better user experience.

Example Operations

Figure 14:
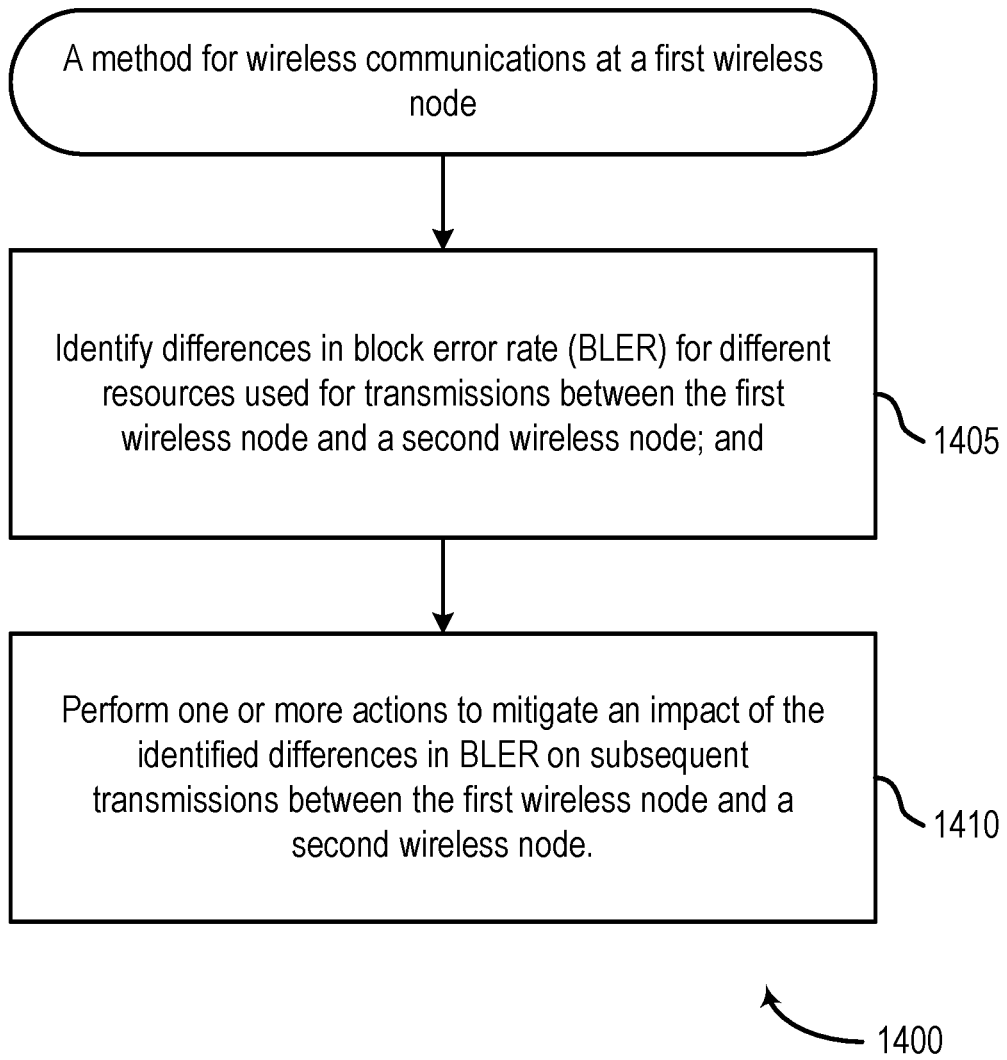
FIG. 14 depicts a method for wireless communications.

FIG. 14 shows an example of a method 1400 of wireless communications at a first wireless node. In some examples, the first wireless node is a user equipment, such as a UE 104 of FIGS. 1 and 3. In some examples, the first wireless node is a network entity, such as a BS 102 of FIGS. 1 and 3, or a disaggregated base station as discussed with respect to FIG. 2.

Method 1400 begins at step 1405 with identifying differences in block error rate (BLER) for different resources used for transmissions between the first wireless node and a second wireless node. In some cases, the operations of this step refer to, or may be performed by, circuitry for identifying and/or code for identifying as described with reference to FIG. 15.

Method 1400 then proceeds to step 1410 with performing one or more actions to mitigate an impact of the identified differences in BLER on subsequent transmissions between the first wireless node and a second wireless node. In some cases, the operations of this step refer to, or may be performed by, circuitry for performing and/or code for performing as described with reference to FIG. 15.

In some aspects, the first wireless node comprises a network entity and the second wireless node comprises a user equipment (UE).

In some aspects, identifying the differences in BLER comprises at least one of: identifying differences in BLER that occur periodically in the time domain; or identifying differences in BLER that occur between different frequency regions.

In some aspects, the method 1400 further includes calculating individual BLERs for a plurality of scheduling resources. In some cases, the operations of this step refer to, or may be performed by, circuitry for calculating and/or code for calculating as described with reference to FIG. 15.

In some aspects, the method 1400 further includes identifying the differences in BLER for different scheduling resources based on the individual BLERs calculated for the plurality of scheduling resources. In some cases, the operations of this step refer to, or may be performed by, circuitry for identifying and/or code for identifying as described with reference to FIG. 15.

In some aspects, the method 1400 further includes maintaining a first data structure to track a first number of attempted transmissions each of the plurality of scheduling resources is used for a transmission between the first wireless node and second node. In some cases, the operations of this step refer to, or may be performed by, circuitry for maintaining and/or code for maintaining as described with reference to FIG. 15.

In some aspects, the method 1400 further includes maintaining a second data structure to track, for each of the plurality of scheduling resources, a second number of the attempted transmissions that were successful, wherein the individual BLERs for each of the plurality of scheduling resources are calculated based on the corresponding first and second numbers. In some cases, the operations of this step refer to, or may be performed by, circuitry for maintaining and/or code for maintaining as described with reference to FIG. 15.

In some aspects, the first and second data structures comprise at least one of a matrix or a vector.

In some aspects, the attempted transmissions comprise transmissions from the first wireless node to the second wireless node; and the second data structure is maintained based on acknowledgment (ACK) feedback from the second wireless node.

In some aspects, each scheduling resource comprises: at least one of a resource block (RB) or RB group (RBGs) in the frequency domain; and at least one slot in the time domain.

In some aspects, the method 1400 further includes calculating, based on first and second data structures, at least one of: per slot BLER values, per RB or per RBG BLER values, or an average BLER value across the plurality of scheduling resources. In some cases, the operations of this step refer to, or may be performed by, circuitry for calculating and/or code for calculating as described with reference to FIG. 15.

In some aspects, the method 1400 further includes identifying at least one of: one or more impacted slots with relatively high BLER based on a comparison of the per slot BLER values to the average BLER value, one or more impacted RBs or RBGs with relatively high BLER based on a comparison of the per RB or per RBG BLER values to the average BLER value, or one or more impacted scheduling resources with relatively high BLER based on a comparison of at least one of the per slot BLER values, or the per RB or per RBG BLER values to the average BLER value. In some cases, the operations of this step refer to, or may be performed by, circuitry for identifying and/or code for identifying as described with reference to FIG. 15.

In some aspects, the one or more actions comprise: utilizing identification of the impacted slots, impacted RBs or RBGs, or impacted scheduling resources as input to an algorithm for at least one of scheduling or link adaptation.

In some aspects, the algorithm calculates at least one of a modulation and coding scheme (MCS) or number of layers for transmissions scheduled on at least one of the impacted slots, impacted RBs or RBGs, or impacted scheduling resources.

In some aspects, the algorithm applies an offset to a channel quality metric to calculate the at least one of an MCS or number of layers for transmissions scheduled on the at least one of the impacted slots, impacted RBs or RBGs, or impacted scheduling resources.

In some aspects, the algorithm identifies potential interference based on identification of the impacted slots, impacted RBs or RBGs, or impacted scheduling resources.

In some aspects, the algorithm avoids scheduling transmissions on at least one of the impacted slots, impacted RBs or RBGs, or impacted scheduling resources to avoid the potential interference.

In some aspects, the one or more actions comprise providing feedback to the second wireless node regarding the identified differences in BLER.

Figure 15:
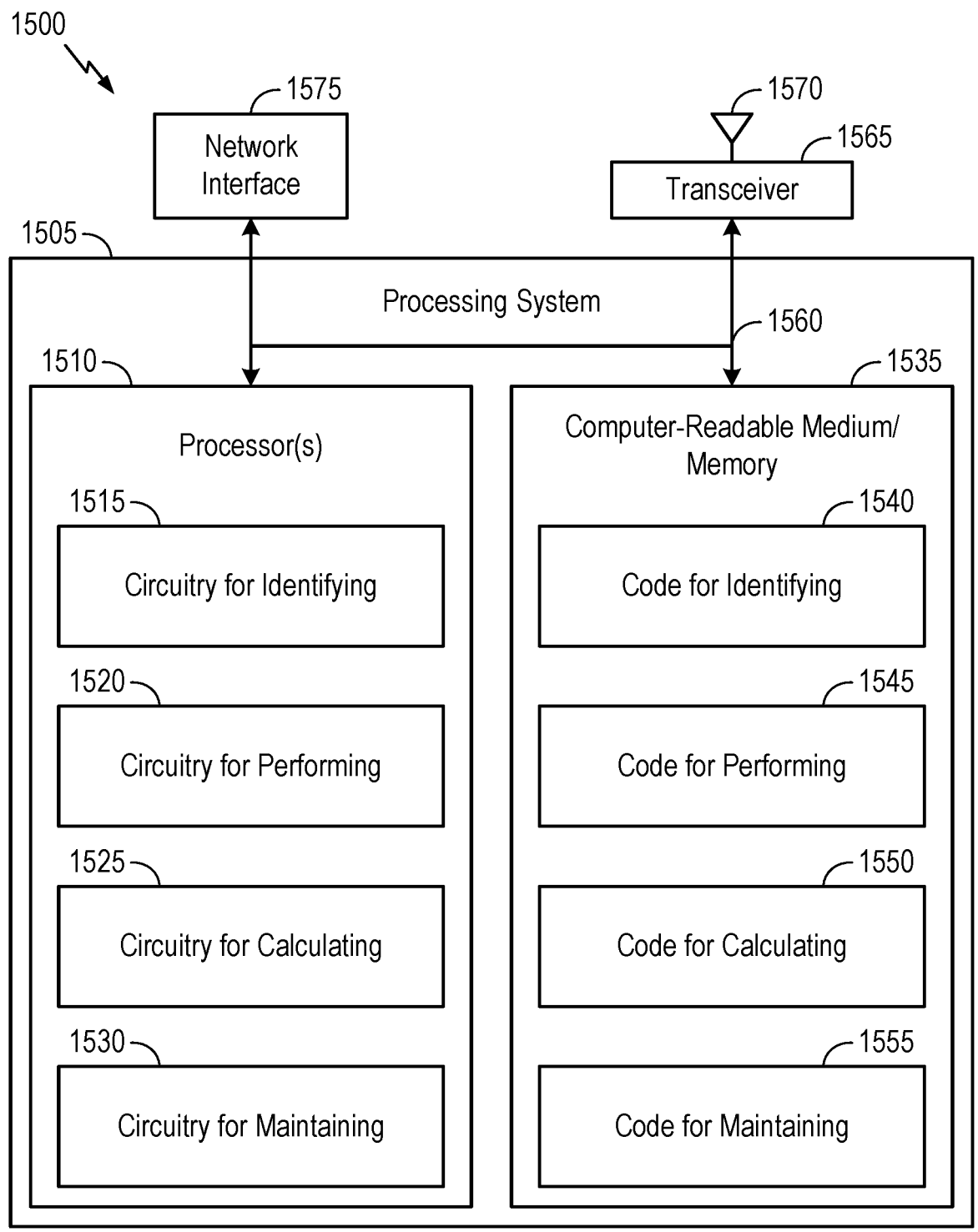
FIG. 15 depicts aspects of an example communications device.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device(s)

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1565 (e.g., a transmitter and/or a receiver). In some aspects (e.g., when communications device 1500 is a network entity), processing system 1505 may be coupled to a network interface 1575 that is configured to obtain and send signals for the communications device 1500 via communication link(s), such as a backhaul link, midhaul link, and/or fronthaul link as described herein, such as with respect to FIG. 2. The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for identifying 1540, code for performing 1545, code for calculating 1550, and code for maintaining 1555. Processing of the code for identifying 1540, code for performing 1545, code for calculating 1550, and code for maintaining 1555 may cause the communications device 1500 to perform the method 1400 described with respect to FIG. 14, or any aspect related to it.

The one or more processors 1510 include circuitry configured to implement (e.g., execute) the code stored in the computer-readable medium/memory 1535, including circuitry for identifying 1515, circuitry for performing 1520, circuitry for calculating 1525, and circuitry for maintaining 1530. Processing with circuitry for identifying 1515, circuitry for performing 1520, circuitry for calculating 1525, and circuitry for maintaining 1530 may cause the communications device 1500 to perform the method 1400 described with respect to FIG. 14, or any aspect related to it.

Various components of the communications device 1500 may provide means for performing the method 1400 described with respect to FIG. 14, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15.

Example Clauses

Implementation examples are described in the following numbered clauses:

Clause 1: A method for wireless communications at a first wireless node, comprising: identifying differences in block error rate (BLER) for different resources used for transmissions between the first wireless node and a second wireless node; and performing one or more actions to mitigate an impact of the identified differences in BLER on subsequent transmissions between the first wireless node and a second wireless node.

Clause 2: The method of Clause 1, wherein the first wireless node comprises a network entity and the second wireless node comprises a user equipment (UE).

Clause 3: The method of any one of Clauses 1-2, wherein identifying the differences in BLER comprises at least one of: identifying differences in BLER that occur periodically in the time domain; or identifying differences in BLER that occur between different frequency regions.

Clause 4: The method of any one of Clauses 1-3, further comprising: calculating individual BLERs for a plurality of scheduling resources; and identifying the differences in BLER for different scheduling resources based on the individual BLERs calculated for the plurality of scheduling resources.

Clause 5: The method of Clause 4, further comprising: maintaining a first data structure to track a first number of attempted transmissions each of the plurality of scheduling resources is used for a transmission between the first wireless node and second node; and maintaining a second data structure to track, for each of the plurality of scheduling resources, a second number of the attempted transmissions that were successful, wherein the individual BLERs for each of the plurality of scheduling resources are calculated based on the corresponding first and second numbers.

Clause 6: The method of Clause 5, wherein the first and second data structures comprise at least one of a matrix or a vector.

Clause 7: The method of Clause 5, wherein: the attempted transmissions comprise transmissions from the first wireless node to the second wireless node; and the second data structure is maintained based on acknowledgment (ACK) feedback from the second wireless node.

Clause 8: The method of Clause 5, wherein each scheduling resource comprises: at least one of a resource block (RB) or RB group (RBGs) in the frequency domain; and at least one slot in the time domain.

Clause 9: The method of Clause 5, further comprising calculating, based on first and second data structures, at least one of: per slot BLER values, per RB or per RBG BLER values, or an average BLER value across the plurality of scheduling resources.

Clause 10: The method of Clause 9, further comprising identifying at least one of: one or more impacted slots with relatively high BLER based on a comparison of the per slot BLER values to the average BLER value, one or more impacted RBs or RBGs with relatively high BLER based on a comparison of the per RB or per RBG BLER values to the average BLER value, or one or more impacted scheduling resources with relatively high BLER based on a comparison of at least one of the per slot BLER values, or the per RB or per RBG BLER values to the average BLER value.

Clause 11: The method of Clause 10, wherein the one or more actions comprise: utilizing identification of the impacted slots, impacted RBs or RBGs, or impacted scheduling resources as input to an algorithm for at least one of scheduling or link adaptation.

Clause 12: The method of Clause 11, wherein the algorithm calculates at least one of a modulation and coding scheme (MCS) or number of layers for transmissions scheduled on at least one of the impacted slots, impacted RBs or RBGs, or impacted scheduling resources.

Clause 13: The method of Clause 12, wherein the algorithm applies an offset to a channel quality metric to calculate the at least one of an MCS or number of layers for transmissions scheduled on the at least one of the impacted slots, impacted RBs or RBGs, or impacted scheduling resources.

Clause 14: The method of Clause 11, wherein the algorithm identifies potential interference based on identification of the impacted slots, impacted RBs or RBGs, or impacted scheduling resources.

Clause 15: The method of Clause 14, wherein the algorithm avoids scheduling transmissions on at least one of the impacted slots, impacted RBs or RBGs, or impacted scheduling resources to avoid the potential interference.

Clause 16: The method of any one of Clauses 1-15, wherein the one or more actions comprise providing feedback to the second wireless node regarding the identified differences in BLER.

Clause 17: An apparatus, comprising: a memory comprising executable instructions; and a processor configured to execute the executable instructions and cause the apparatus to perform a method in accordance with any one of Clauses 1-16.

Clause 18: An apparatus, comprising means for performing a method in accordance with any one of Clauses 1-16.

Clause 19: A non-transitory computer-readable medium comprising executable instructions that, when executed by a processor of an apparatus, cause the apparatus to perform a method in accordance with any one of Clauses 1-16.

Clause 20: A computer program product embodied on a computer-readable storage medium comprising code for performing a method in accordance with any one of Clauses 1-16.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a first wireless node, comprising:
    memory comprising executable instructions; and
    one or more processors configured to execute the executable instructions and cause the apparatus to:
        identify differences in block error rate (BLER) for different resources used for transmissions between the first wireless node and a second wireless node, wherein, to identify the differences in BLER, the one or more processors are configured to cause the apparatus to:
            calculate individual BLERs associated with transmissions on a plurality of scheduling resources;
            maintain a first data structure to track a first number of attempted transmissions each of the plurality of scheduling resources is used for a transmission between the first wireless node and second wireless node; and
            maintain a second data structure to track, for each of the plurality of scheduling resources, a second number of the attempted transmissions that were successful, wherein the individual BLERs for each of the plurality of scheduling resources are calculated based on the corresponding first and second numbers; and
        identify differences between the individual BLERs; and
    perform one or more actions to mitigate an impact of the identified differences in BLER on subsequent transmissions between the first wireless node and the second wireless node.

2. The apparatus of claim 1, wherein the first wireless node comprises a network entity and the second wireless node comprises a user equipment (UE).

3. The apparatus of claim 1, wherein identifying the differences in BLER comprises at least one of:
    identifying differences in BLER that occur periodically in a time domain; or
    identifying differences in BLER that occur between different frequency regions.

4. The apparatus of claim 1, wherein the first and second data structures comprise at least one of a matrix or a vector.

5. The apparatus of claim 1, wherein:
    the attempted transmissions comprise transmissions from the first wireless node to the second wireless node; and
    the second data structure is maintained based on acknowledgment (ACK) feedback from the second wireless node.

6. The apparatus of claim 1, wherein each scheduling resource comprises:
    at least one of a resource block (RB) or RB group (RBGs) in a frequency domain; and
    at least one slot in a time domain.

7. The apparatus of claim 1, wherein the one or more processors are configured to execute the instructions and further cause the apparatus to:
    calculate, based on first and second data structures, at least one of:
        per slot BLER values, per RB or per RBG BLER values, or
        an average BLER value across the plurality of scheduling resources.

8. The apparatus of claim 7, wherein the one or more processors are configured to execute the instructions and further cause the apparatus to:
    identify at least one of:
        one or more impacted slots with relatively high BLER based on a comparison of the per slot BLER values to the average BLER value,
        one or more impacted RBs or RBGs with relatively high BLER based on a comparison of the per RB or per RBG BLER values to the average BLER value, or
        one or more impacted scheduling resources with relatively high BLER based on a comparison of at least one of the per slot BLER values, or the per RB or per RBG BLER values to the average BLER value.

9. The apparatus of claim 8, wherein the one or more actions comprise:

utilizing identification of the impacted slots, impacted RBs or RBGs, or impacted scheduling resources as input to an algorithm for at least one of scheduling or link adaptation.

10. The apparatus of claim 9, wherein the algorithm calculates at least one of a modulation and coding scheme (MCS) or number of layers for transmissions scheduled on at least one of the impacted slots, impacted RBs or RBGs, or impacted scheduling resources.

11. The apparatus of claim 10, wherein the algorithm applies an offset to a channel quality metric to calculate the at least one of an MCS or number of layers for transmissions scheduled on the at least one of the impacted slots, impacted RBs or RBGs, or impacted scheduling resources.

12. The apparatus of claim 9, wherein the algorithm identifies potential interference based on identification of the impacted slots, impacted RBs or RBGs, or impacted scheduling resources.

13. The apparatus of claim 12, wherein the algorithm avoids scheduling transmissions on at least one of the impacted slots, impacted RBs or RBGs, or impacted scheduling resources to avoid the potential interference.

14. The apparatus of claim 1, wherein the one or more actions comprise providing feedback to the second wireless node regarding the identified differences in BLER.

15. A method for wireless communications at a first wireless node, comprising:
 identifying differences in block error rate (BLER) for different resources used for transmissions between the first wireless node and a second wireless node, wherein identifying the differences in BLER includes:
  calculating individual BLERs associated with transmissions on a plurality of scheduling resources;
  maintaining a first data structure to track a first number of attempted transmissions each of the plurality of scheduling resources is used for a transmission between the first wireless node and second wireless node; and
  maintaining a second data structure to track, for each of the plurality of scheduling resources, a second number of the attempted transmissions that were successful, wherein the individual BLERs for each of the plurality of scheduling resources are calculated based on the corresponding first and second numbers; and
  identifying differences between the individual BLERs; and
 performing one or more actions to mitigate an impact of the identified differences in BLER on subsequent transmissions between the first wireless node and the second wireless node.

16. The method of claim 15, wherein the first wireless node comprises a network entity and the second wireless node comprises a user equipment (UE).

17. The method of claim 15, wherein identifying the differences in BLER comprises at least one of:
 identifying differences in BLER that occur periodically in a time domain; or
 identifying differences in BLER that occur between different frequency regions.

18. The method of claim 15, wherein the first and second data structures comprise at least one of a matrix or a vector.

19. The method of claim 15, wherein:
 the attempted transmissions comprise transmissions from the first wireless node to the second wireless node; and
 the second data structure is maintained based on acknowledgment (ACK) feedback from the second wireless node.

20. The method of claim 15, wherein each scheduling resource comprises:
 at least one of a resource block (RB) or RB group (RBGs) in a frequency domain; and
 at least one slot in a time domain.

21. The method of claim 15, further comprising calculating, based on first and second data structures, at least one of:
 per slot BLER values,
 per RB or per RBG BLER values, or
 an average BLER value across the plurality of scheduling resources.

22. The method of claim 21, further comprising identifying at least one of:
 one or more impacted slots with relatively high BLER based on a comparison of the per slot BLER values to the average BLER value,
 one or more impacted RBs or RBGs with relatively high BLER based on a comparison of the per RB or per RBG BLER values to the average BLER value, or
 one or more impacted scheduling resources with relatively high BLER based on a comparison of at least one of the per slot BLER values, or the per RB or per RBG BLER values to the average BLER value.

23. The method of claim 22, wherein the one or more actions comprise:
 utilizing identification of the impacted slots, impacted RBs or RBGs, or impacted scheduling resources as input to an algorithm for at least one of scheduling or link adaptation.

24. The method of claim 23, wherein the algorithm calculates at least one of a modulation and coding scheme (MCS) or number of layers for transmissions scheduled on at least one of the impacted slots, impacted RBs or RBGs, or impacted scheduling resources.

25. A non-transitory computer readable medium having instructions stored thereon for:
 identifying differences in block error rate (BLER) for different resources used for transmissions between a first wireless node and a second wireless node, wherein to identify the differences in BLER, the non-transitory computer readable medium has instructions stored thereon for:
  calculating individual BLERs associated with transmissions on a plurality of scheduling resources;
  maintaining a first data structure to track a first number of attempted transmissions each of the plurality of scheduling resources is used for a transmission between the first wireless node and second wireless node; and
  maintaining a second data structure to track, for each of the plurality of scheduling resources, a second number of the attempted transmissions that were successful, wherein the individual BLERs for each of the plurality of scheduling resources are calculated based on the corresponding first and second numbers; and
  identifying differences between the individual BLERs; and
 performing one or more actions to mitigate an impact of the identified differences in BLER on subsequent transmissions between the first wireless node and the second wireless node.

26. An apparatus for wireless communications at a first wireless node, comprising:

means for identifying differences in block error rate (BLER) for different resources used for transmissions between the first wireless node and a second wireless node, wherein the means for identifying the differences in BLER comprises:
  means for calculating individual BLERs associated with transmissions on a plurality of scheduling resources;
  means for maintaining a first data structure to track a first number of attempted transmissions each of the plurality of scheduling resources is used for a transmission between the first wireless node and second wireless node; and
  means for maintaining a second data structure to track, for each of the plurality of scheduling resources, a second number of the attempted transmissions that were successful, wherein the individual BLERs for each of the plurality of scheduling resources are calculated based on the corresponding first and second numbers; and
  means for identifying differences between the individual BLERs; and
means for performing one or more actions to mitigate an impact of the identified differences in BLER on subsequent transmissions between the first wireless node and the second wireless node.

\* \* \* \* \*